(12) United States Patent
Sukegawa et al.

(10) Patent No.: US 7,726,187 B2
(45) Date of Patent: Jun. 1, 2010

(54) THERMAL TYPE FLOW METER AND ENGINE CONTROL SYSTEM USING THE SAME

(75) Inventors: Yoshihiro Sukegawa, Hitachi (JP); Noboru Tokuyasu, Hitachinaka (JP); Hiroaki Hoshika, Hitachiomiya (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/126,429

(22) Filed: May 23, 2008

(65) Prior Publication Data

US 2008/0295590 A1 Dec. 4, 2008

(30) Foreign Application Priority Data

May 25, 2007 (JP) ............................. 2007-138547

(51) Int. Cl.
*G01F 1/68* (2006.01)
(52) U.S. Cl. .................................. 73/204.27
(58) Field of Classification Search ........................ None
See application file for complete search history.

(56) References Cited

U.S. PATENT DOCUMENTS

| | | | | |
|---|---|---|---|---|
| 2,733,605 A * | 2/1956 | Buck | ....................... | 73/204.14 |
| 4,833,912 A * | 5/1989 | Ohta et al. | ............... | 73/114.32 |
| 5,033,299 A * | 7/1991 | Tanaka et al. | ............ | 73/204.26 |
| 5,351,537 A * | 10/1994 | Uramachi | ................ | 73/204.26 |
| 6,745,625 B2 * | 6/2004 | Ariyoshi | .................. | 73/204.26 |
| 7,213,455 B2 * | 5/2007 | Kobayashi et al. | ....... | 73/204.25 |
| 2005/0132795 A1* | 6/2005 | Kobayashi et al. | ....... | 73/204.15 |
| 2007/0251315 A1* | 11/2007 | Sukegawa et al. | ........ | 73/204.27 |
| 2009/0090177 A1* | 4/2009 | Sukegawa et al. | ........ | 73/204.25 |

FOREIGN PATENT DOCUMENTS

| | | | |
|---|---|---|---|
| JP | 59-136620 | | 8/1984 |
| JP | 60063421 A | * | 4/1985 |
| JP | 2805175 | | 7/1998 |

* cited by examiner

*Primary Examiner*—Harshad Patel
(74) *Attorney, Agent, or Firm*—Mattingly & Malur, P.C.

(57) ABSTRACT

A thermal type flow meter has a first heating resistor, a second heating resistor for blocking heat transfer from the first heating resistor to a console, a temperature measuring resistor interposed between the two heating resistors, and a controller for calculating a flow rate unrelated to temperatures of fluid from temperatures of the resistors and currents supplied to the heating resistors.

9 Claims, 17 Drawing Sheets

FIG.15
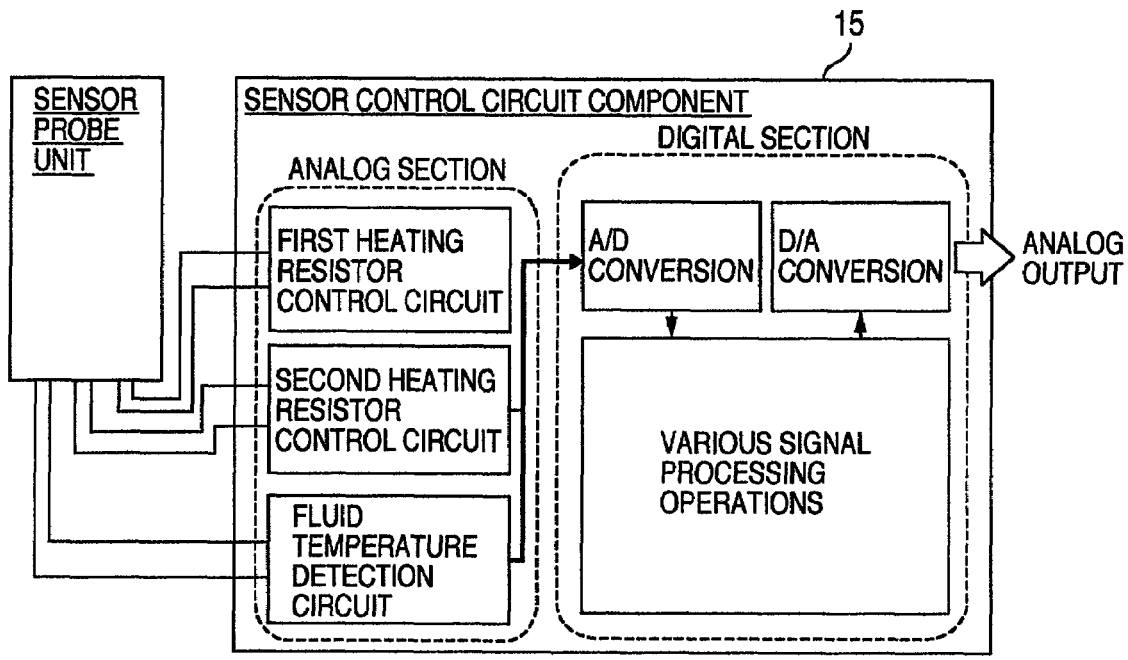
FIG.16A     FIG.16B
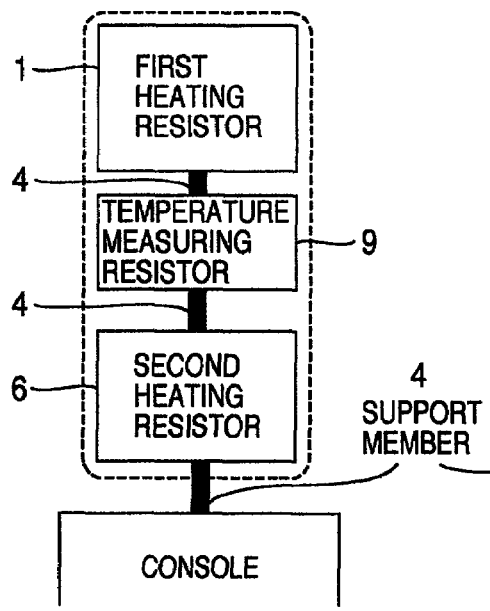
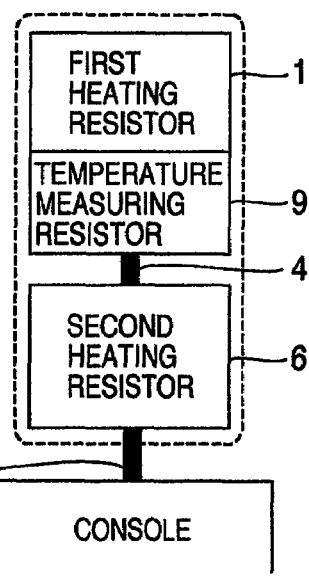

THERMAL TYPE FLOW METER AND ENGINE CONTROL SYSTEM USING THE SAME

BACKGROUND OF THE INVENTION

The present invention relates to a thermal type flow meter for detecting flow rates of intake and exhaust gas of an engine and its control method.

In a thermal type flow meter as shown in FIG. 1, at least two resistors are disposed in fluid, one of them being used as a temperature measuring resister (CW) for detecting temperatures of the fluid with the other as a heating resister (HW) for detecting flow rates, and the temperature difference ($\Delta T_h$) between these resistors is always kept to be constant so as to realize measurement of mass flow rates of the fluid.

This type of thermal flow meter faces a problem that because of the independently separate arrangement of heating resistor and temperature measuring resistor in the fluid, the installation space increases, the pressure loss increases and the production cost is high.

In general, the temperature measuring resistor adapted to detect fluid temperatures is not heated normally by conduction of electric current whereas the heating resistor is set to such a temperature sufficiently higher than a fluid temperature as providing $\Delta T_h = 200°$ C., for example. When a flow rate sensor having the structure as above is used in an exhaust gas atmosphere, an oil component or the like contained in exhaust gas deposits on the sensor surface. If the resistor is at a sufficiently high temperature, the oil component deposited on the sensor surface evaporates and so the sensor can be prevented from being contaminated. But the temperature measuring resistor being at a relatively low temperature cannot evaporate the oil component deposited on its surface and as a result, contaminants cumulate on its surface. With the contaminants cumulated, the fluid temperature cannot possibly be detected accurately and errors in measurement of flow rate will take place.

JP-A-59-136620 describes an expedience in which any temperature measuring resistor not heated by current conduction is unused but two heating resistors are disposed in fluid in order that a flow rate unrelated to fluid temperature is detected from the relation between quantities of heat supplied to the fluid from the respective heating resistors. In the technique disclosed in JP-A-59-136620, the fluid flow rate $\rho U$ can be determined from equation (1):

$$\rho U = C \frac{(I_1^2 - I_2^2)^2}{(T_1 - T_2)^2} \tag{1}$$

wherein $\rho$: fluid density, U: fluid velocity,

I1: electric current of heating resister I

I2: electric current of heating resister II

T1: temperature of heating resister I

T2: temperature of heating resister II, and

C: constant value.

As is clear from equation (1), the liquid flow rate is inverse proportional to the square of a difference in temperature between the two heating resistors and therefore, if the temperature difference between the two heating resistors is small, errors are liable to develop in the flow rate obtained from equation (1). It has been considered that for the sake of preventing heat dissipation from the heating resistor to its support member, a plurality of heating resistors may mutually be arranged intimately closely but in such a contrivance, the plural heating resistors are set to be at the same temperature or at very close temperatures. Therefore, in order to utilize the technique described in the above Patent Document, there needs another heating resistor for which temperature setting is discriminatively different from that for the plural heating resistors, raising a problem that the sensor structure becomes complicated.

Further, the technique described in the aforementioned JP-A-59-136620 fails to consider heat dissipation or transfer from the heating resistor to its support member, resulting in a problem that if the heating resistor is at high temperatures and heat dissipation to its support member cannot be negligible vis-à-vis heat dissipation to the liquid, the error in flow rate detection grows.

Incidentally, Japanese Patent No. 2805175 discloses a technique in which a single heating resistor is used to detect a flow rate having no relations with fluid temperatures. In the latter technique, there is provided a switch for bypassing a fixed resistor connected to a bridge circuit and the flow rate unrelated to the temperature of fluid is detected from a change in amounts of heat dissipation from the heating resistor when the switch is turned on and off. The latter technique, however, faces a problem that if the fluid temperature and the flow rate change at higher periods than the period of turn on and off of the switch, accuracy in flow rate detection will be degraded. As known in the art, high-frequency pulsations take place in the course of intake and exhaust of an engine and the error in measurement will possibly grow in the pulsation field as above.

SUMMARY OF THE INVENTION

It is an object of this invention to provide a flow rate measuring apparatus of heating resistor type which can assure less degradation in accuracy attributable to contamination and the like.

According to the present invention, the above object can be accomplished by a flow rate measuring apparatus of heating resistor type comprising a first heating resistor disposed in a passage, an electronic circuit electrically connected to the first heating resistor, an output terminal connected to the electronic circuit, a support member for supporting the first heating resistor, a second heating resistor interposed between the first heating resistor and the support member, a temperature detection element interposed between the first and second heating resistors, and a controller for controlling heat generation by the second heating resistor such that temperatures detected by the temperature detection element falls into a predetermined temperature range inclusive of temperatures of the first heating resistor.

The flow meter measuring apparatus constructed as above has an advantage that a sensor can be reduced in size to facilitate assurance of installation space and to decrease the pressure loss and the production cost as well.

Other objects, features and advantages of the invention will become apparent from the following description of the embodiments of the invention taken in conjunction with the accompanying drawings.

BRIEF DESCRIPTION OF THE DRAWINGS

FIG. 15 is a functional block diagram schematically showing the construction of a sensor module according to the invention.

FIGS. 16A and 16B are schematic diagrams showing the construction of a sensor device for materializing the embodiments of the invention.

DESCRIPTION OF THE EMBODIMENTS

Figure 1:
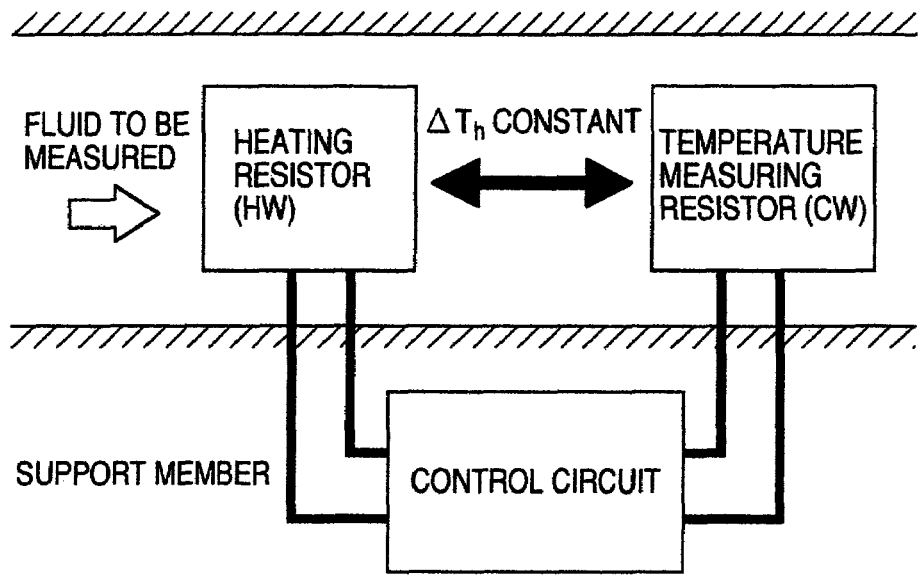
FIG. 1 is a diagram schematically showing the construction of an intake air flow meter.
Figure 2:
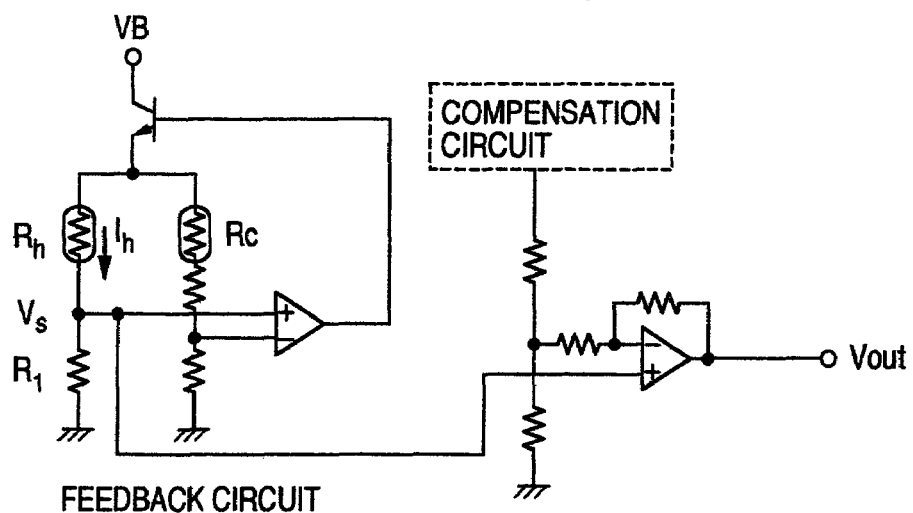
FIG. 2 is a circuit diagram of a bridge control circuit in the intake air flow meter.

Referring first to FIGS. 1 and 2, the principle of a thermal type flow meter representing the leading type of intake air flow meter will be described briefly. The thermal type flow meter is constructed as shown in FIG. 1. In the thermal type meter configuration, at least two resistors are disposed in fluid, one of them being used as a temperature measuring resister for detecting temperatures of the fluid with the other as a heating resister for detecting the flow rate, and a temperature difference ($\Delta Th$) between these resistors is always kept to be constant so as to realize measurement of mass flow rates of the fluid. Then, in the intake air flow meter, by totally judging the measurement accuracy, responsibility, prevention of contamination attributable to dust and durability or heat-proof capability of a material used, $\Delta Th$ is set in general to about 200° C.

A bridge control circuit configured as shown in FIG. 2 is used. The heating resistor and temperature measuring resistor are arranged to impersonate bridge circuit resistors. Where the heating resistor has a resistance value of $R_h$ and current flowing through the heating resistor is $I_h$, a total amount $P_h$ of heat generated by the heating resistor is related to a mass flow rate $\rho U$ of the fluid passing by the heating resistor and to a $\Delta T_h$, as expressed by equation (2):

$$P_h = I_h^2 R_h = (A + B\sqrt{\rho U})\Delta T_h \tag{2}$$

In equation (2), A represents a heat conduction amount (heat leakage) from the heating resistor to its support member and B a heat transfer amount the fluid deprives and then they are collectively termed thermal constants. It will be seen from equation (2) that voltage $V_s$ developing at the middle point between heating resistor $R_h$ and fixed resistor $R_1$ is expressed by equation (3), being dependent on a mass flow rate of the fluid. The voltage $V_s$ is amplified to an analog voltage value which in turn is delivered as a sensor output $V_{out}$.

$$V_s = R_i \cdot I_h = R_i \sqrt{\frac{1}{R_h}(A + B\sqrt{\rho U})\Delta T_h} \tag{3}$$

Incidentally, in the device used in exhaust gas environment, contamination is seriously problematic. Contamination on the sensor device has a fatal influence upon the maintenance of metering accuracy in the thermal type flow meter although the degree of influence differs depending on the use purpose and principle of the device.

In the exhaust gas environment of internal combustion engines, nonvolatile components contained in particulate matter (PM) such as dry soot and ash exhausted from the engine are targeted as contaminants. The dry soot originates from insufficient mixture of air suctioned to a combustion chamber of the engine and fuel injected thereto, that is, insufficient oxidation. While contamination is caused by adhesion of volatile components such as soluble organic fraction (SOF) and hydrocarbon (HC) contained in the PM, the contents of the volatile components are determined by combustion in the internal combustion engine, so that the generation of contamination can be controlled depending on temperatures of the target matter.

Figure 3:
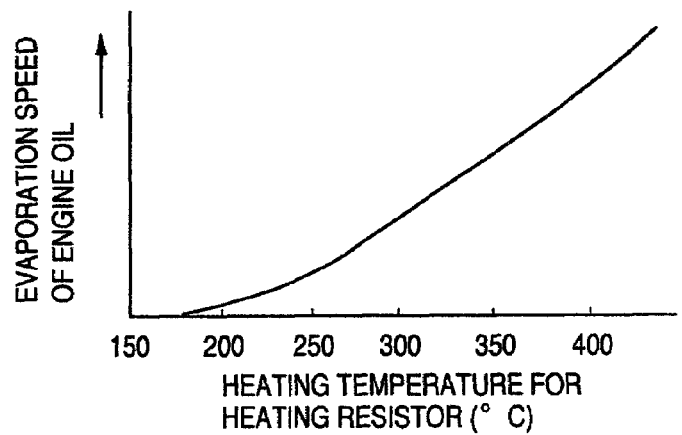
FIG. 3 is a graph showing the relation between heating resistor temperature and evaporation speed of engine oil.

Turning to FIG. 3, the relation between temperatures of heat generated by the heating resistor and evaporation speed of engine oil is graphically illustrated. The higher the heating temperature, the higher the evaporation speed becomes. Further, the result of verification of existing engines shows that contamination on the heating resistor for flow rate detection depends on heating temperature and especially when the temperature of the heating resistor is set to about 350° C. or more, the contamination can be avoided. Gathering from results of the existing engine verification and basic studies, the presence or absence of contamination is considered as originating from a phenomenon to be described below.

Figure 4:
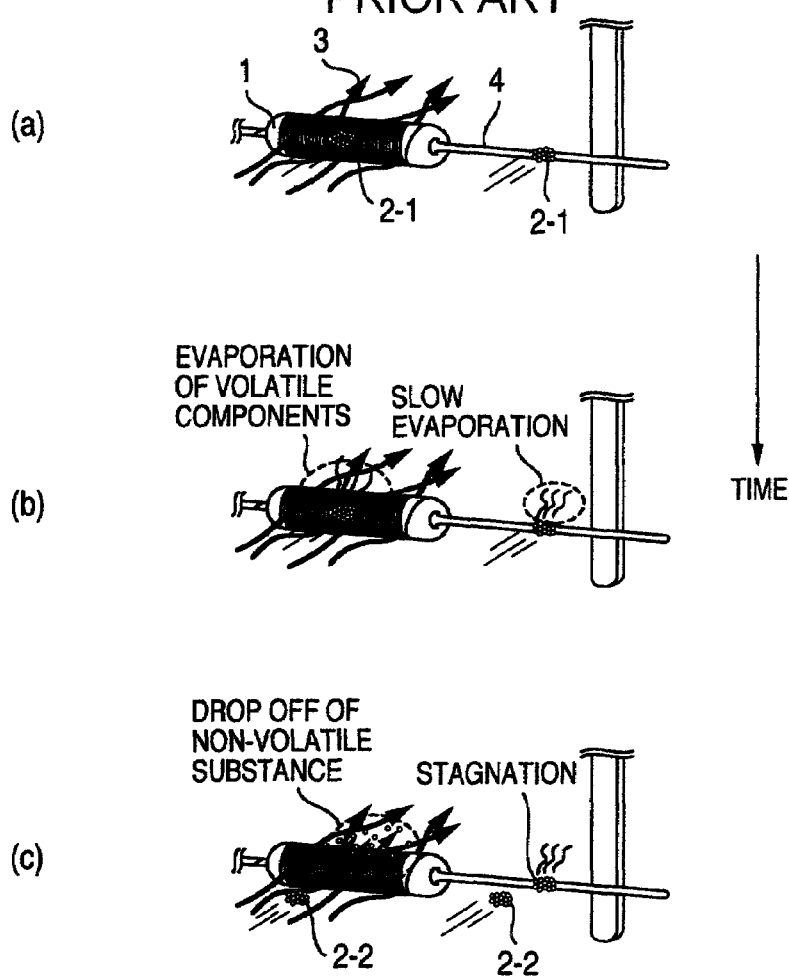
FIG. 4 is a diagram useful to explain in sections (a) through (c) the cause of generation of contamination when the heating resistor is heated.

Reference is now made to sections (a) to (c) in FIG. 4. When PM 2-1 first impinges on a heating resistor 1 heated to a high temperature (a), volatile components are evaporated instantaneously by heat transferred from the heating resistor and the adhesion the PM 2-1 has is reduced as will be seen at (b). But, nonvolatile components which contain mainly dry soot representing a contaminant are affected by their reduced adhesion and a fluid stream 3 as well to gradually drop off the surface of the heating resistor until the next impingement of PM takes place as will also be seen at (c). On the other hand, on a lead member of support member 4 at a low temperature, evaporation of volatile components proceeds slowly after the PM 2-1 has deposited, that is, time necessary for a reduction in its adhesion leading to the drop off phenomenon prolongs as shown at (b) and it is conceivable that the subsequently impinging PM 2-2 will be caused to superpose the precedently deposited PM 2-1 and stack thereon as will be seen at (c).

Figure 5:
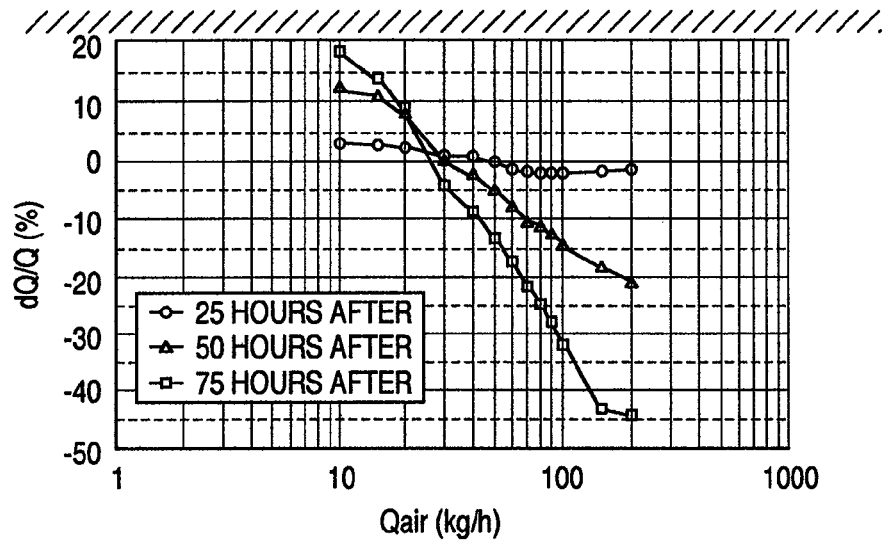
FIG. 5 is a graphical representation illustrating results of actual measurement when a sensor device for intake flow rate meter is applied.

When a conventional intake air flow sensor device which is devoid of a protective heater is used, the output of the sensor changes to a great extent within a short period of time in relation to the fluid flow rate as the time elapses. Results of actual measurement as to how far the output changes are graphically illustrated in FIG. 5. The result shows errors obtained when the idling run state keeps continuing, demonstrating that positive errors tend to occur in a low flow rate region and negative errors tend to occur in a high flow rate region. It should be understood that especially in the case of 75 hours after test start, a great error of 50% develops in the vicinity of the maximum flow rate within the test range. Accordingly, a technical idea as to how to overcome this problem will be described hereunder.

Figure 6:
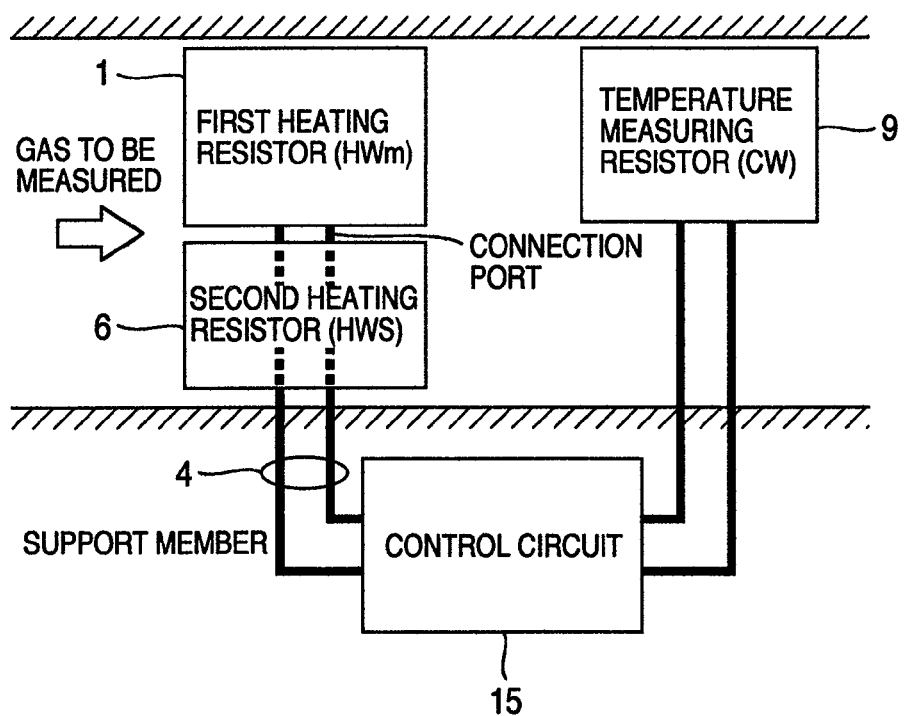
FIG. 6 is a diagram schematically showing the construction of a thermal type flow meter having a second heating resistor.

The basic construction for the measure is illustrated in FIG. 6. As clearly understood at a glance through comparison with FIG. 1, a second heating resistor (protective heater) is interposed between the heating resistor for flow rate detection so termed in FIG. 1 (termed a first heating resistor in FIG. 6) and its support member connecting to the console. In this basic construction, heat transfer from the first heating resistor to the support member can be blocked by means of the intervening second heating resistor. A structure of the sensor device will specifically be described later but the sensor device structure provided by the present invention is a mere example and the structure is not particularly restricted so long as it satisfies the adiabatic nature as above.

The reason why the meritorious effect can be expected by providing the second heating resistor will now be described.

Referring to equation (2) indicating how the total heat generation amount $P_h$ of the heating resistor is related to the mass flow rate Q, that is, $\rho U$ of fluid flowing to the heating resistor and the $\Delta T_h$, as the thermal constant A representing an amount of heat conduction (heat leakage) from the heating resistor to its support member changes, errors take place. By virtue of the second heating resistor arranged as above, the heat generation amount necessary for the first heating resistor and the heat transfer amount to the support member can be separated from each other. More particularly, with the construction capable of arbitrarily controlling the heat transfer amount between the first and second heating resistors, detection of the fluid flow rate can be achieved regardless of contamination on the support member.

Figure 7:
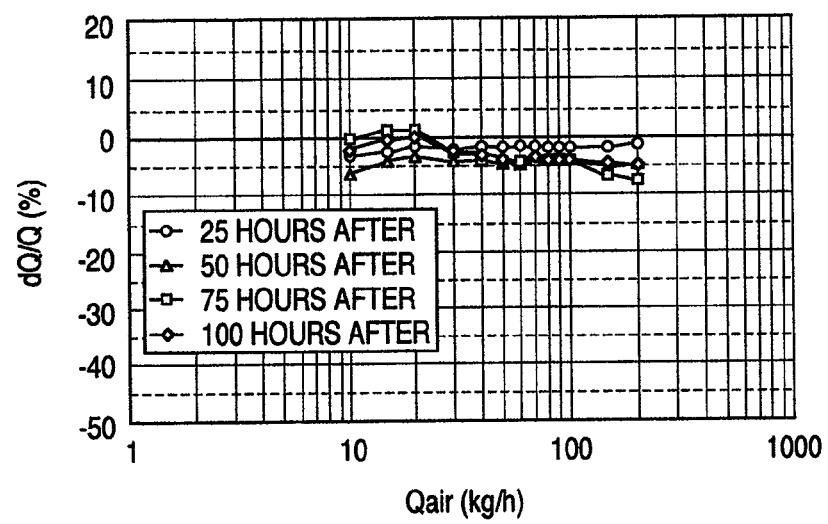
FIG. 7 is a graphical representation illustrating results of actual measurement when a sensor device having the second heating resistor is applied.

Results of actual measurement obtained by using the sensor device having the second heating resistor arranged are graphically illustrated in FIG. 7. It should be understood that even in the case of 100 hours after test start, the error in output characteristics relative to the initial characteristics can be suppressed to within about 5%, thus clearly indicating through comparison with the result in FIG. 5 that improvements can be achieved efficiently to a great extent as compared to the case of using the conventional sensor device.

Figure 8A:
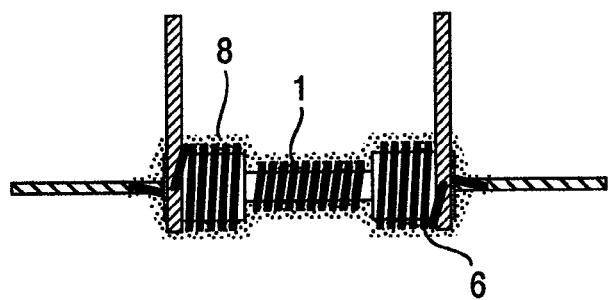
FIGS. 8A and 8B illustrate an example of a sensor device structure having a second heating resistor based on a winding type sensor device for intake gas.
Figure 8B:
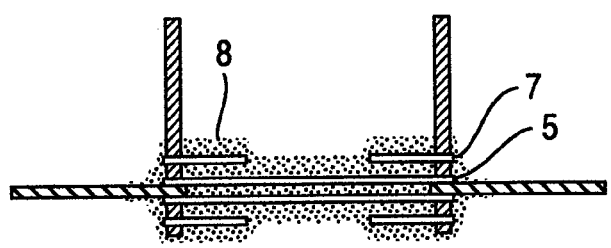
Figure 9A:
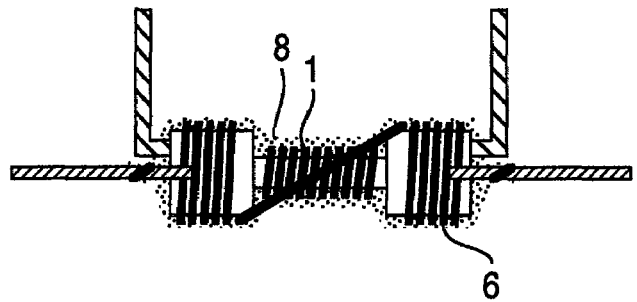
FIGS. 9A and 9B illustrate another example of the sensor device structure having a second heating resistor also based on the winding type sensor device for intake gas.
Figure 9B:
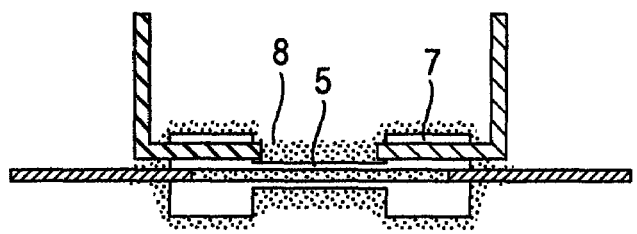

Next, examples of the sensor device with the second heating resistor which are considered to be structured as shown in FIGS. 8A and 8B and FIGS. 9A and 9B on the basis of the existing sensor device structure for intake air flow meter will be described. FIGS. 8B and 9B are cross-sectional view of FIGS. 8A and 9A, respectively. As an insulator for forming the heating resistor of sensor device, an alumina pipe 5 is used and through the medium of highly heat-resistant glass, for example, the alumina pipe 5 and its support member 4 are interconnected. A Pt line 1 (winding) forming the first heating resistor for flow rate detection is wound helically on a middle portion of the alumina pipe 5. Then, at opposite ends of the resulting structure, alumina pipe segments 7 are provided on which, like the first heating resistor, a Pt line 6 forming second heating resistor is wound helically and an insulating protective film (glass) 8 is coated to wrap the whole of sensor device. In the example of FIGS. 8A and 8B, the alumina pipe is formed separately from the alumina pipe sections but in the example shown in FIGS. 9A and 9B, they are formed integrally.

Figure 10:
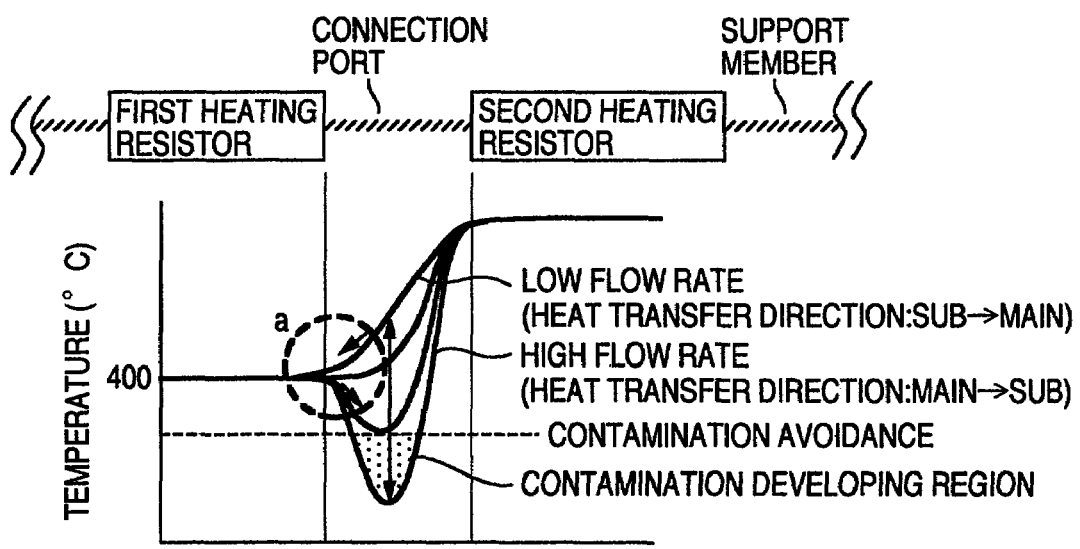
FIG. 10 is a diagram useful in explaining a problem encountered when the sensor device having the second heating resistor is applied.

The above device structure, however, faces a problem to be described below with reference to FIG. 10. When current is conducted through the sensor device as shown in FIGS. 8A and 8B or FIGS. 9A and 9B to keep the first and second heating resistors at high temperatures and under this condition, fluid is passed, the temperature changes at individual portions to provide a temperature distribution as shown in FIG. 10. Supposedly, upon setting temperatures at the individual heating resistors, 400° C. is set to the first heating resistor 1 and 400° C. or more is set to the second heating resistor 6. In this manner, the relation between the setting temperature of first heating resistor and that of second heating resistor is preferably governed to meet (value of first heating resistor)<(value of second heating resistor). This is because the changes in heat transfer to fluid attributable to stacked dry soot as described previously can all be compensated by heat transfer from the second heating resistor and therefore an adverse influence the contamination has upon the measurement of flow rate can be suppressed. Incidentally, the temperature at a connection port between the first and second heating resistors changes with a flow rate (flow speed) of fluid streaming over the sensor device. Especially when adjustment is such that the respective heating resistors can hold target temperatures during stoppage of stream or at a low flow rate, the temperature at the connection port becomes low within a high flow rate range and then, if a condition of temperature lower than a contamination avoidance temperature (about 350° C.) proceeds successively, contamination will possibly develop at the connection port. From the viewpoint of the principle, the occurrence of contamination at the connection port makes the disposition of second heating resistor meaningless. Thus, there need measures of keeping the temperature at the connection port from being reduced drastically. In addition, the heat transfer/reception status at the end of first heating resistor corresponding to a portion designated by indication a in the figure changes depending on the flow rate. In an ideal state, the temperature gradient at the first heating resistor end is zero. If this state is satisfied, there are no flow-in of heat from the first heating resistor to the second heating resistor and no flow-out of heat to the connection port and hence the present problem attributable to heat transfer can be overcome steadily.

Figure 11:
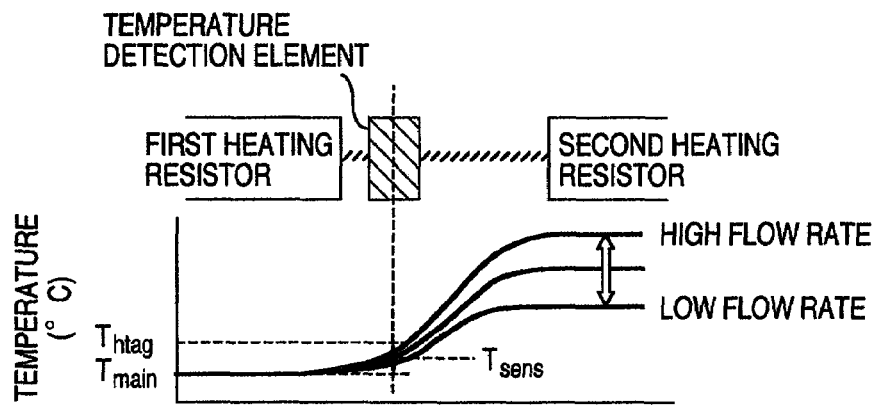
FIG. 11 is a diagram showing example 1 of the construction of an embodiment according to the present invention.
Figure 12:
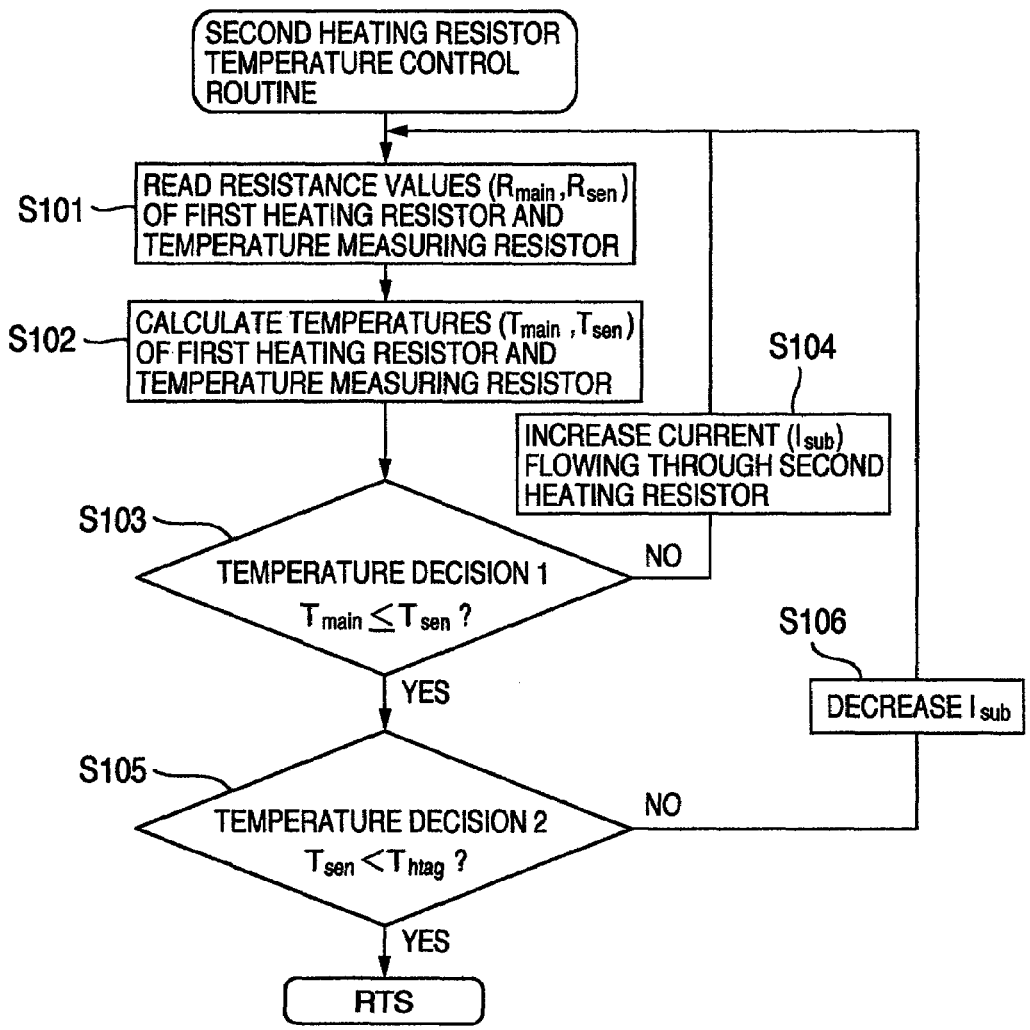
FIG. 12 is a flowchart showing control flow 1 in the FIG. 11 embodiment.

Embodiments of the present invention will now be described. Referring to FIG. 11, there is illustrated an embodiment of this invention. In essentiality, a temperature detection element is arranged at a position close to a first heating resistor. As the temperature detection element, a winding of Pt line like the heating resistor may simply be considered but any other means capable of detecting temperatures may be adoptable. This construction is based on a method which presupposes the relation of (first heating resistor setting temperature)<(second heating resistor setting temperature) to control temperatures of heat generated by the second heating resistor on the basis of a temperature detected by the temperature detection element. A concrete control flow is shown in FIG. 12. The control shown in the flow chart of FIG. 12 is executed by the control circuit 15 shown in FIG. 6. Firstly, a resistance $R_{main}$ of the first heating resistor and a resistance $R_{sen}$ of the temperature detection element (hereinafter referred to as temperature measuring resistor) are first read (S101) and respective temperatures $T_{main}$ and $T_{sen}$ are calculated (S102). Subsequently, in step S103, it is decided whether the relation between the calculated temperatures $T_{main}$ and $T_{sen}$ meets $T_{main} \leq T_{sen}$ and if No, the program proceeds to step S104 where current $I_{sub}$ passed to the second heating resistor is increased, followed by return to the step S101. Through this routine, the temperature of the second heating resistor increases and the temperature $T_{sen}$ increases correspondingly. This repeats itself. On the other hand, if Yes is issued in the step S103, the program proceeds to step S105 where it is decided whether the relation between the temperature $T_{sen}$ and a preset upper limit target temperature $T_{htag}$ of the $T_{sen}$ meets $T_{sen} < T_{htag}$. If this relation is unmeet, the program proceeds to step S106 where the $I_{sub}$ is reduced to lower the $T_{sen}$, followed by return to the step S101. If the relation is satisfied in the step S105, the control loop ends. By repeating this loop within a short period of time, the relation $T_{main} \leq T_{sen} < T_{htag}$ can be held and the temperature gradient in the first heating resistor end can be so controlled as to fall into a predetermined range.

Figure 13:
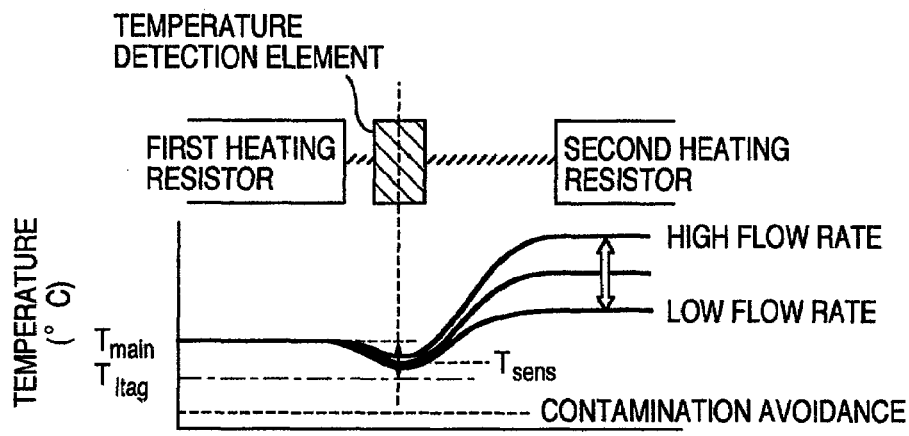
FIG. 13 is a diagram showing example 2 of the construction of another embodiment according to the present invention.
Figure 14:
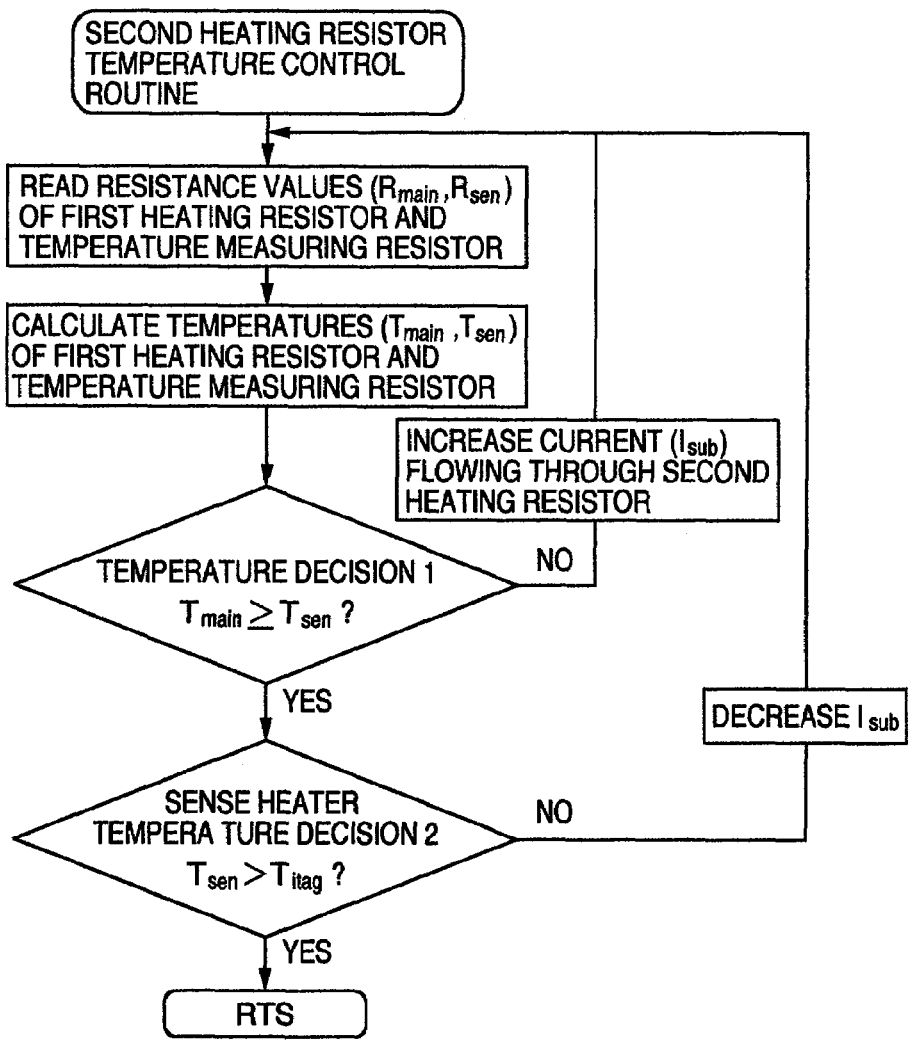
FIG. 14 is a flowchart showing control flow 2 in the FIG. 13 embodiment.

Conceivably, in another control method presupposing that the relation between setting temperatures of the first and second heating resistors meets (value of first heating resistor) <(value of second heating resistor), a lower limit target temperature $T_{ltag}$ of the $T_{sen}$ is provided as shown in FIGS. 13 and 14 and control is performed to hold the relation $T_{ltag} < T_{sen} \leq T_{main}$. Or alternatively, upper and lower limit target temperatures may be provided for the $T_{sen}$ and control may be performed to hold the relation $T_{ltag} < T_{sen} < T_{htag}$. In all of the modes, $T_{htag}$ and $T_{ltag}$ need to be set to temperature levels for which the temperature gradient at the first heating resistor end can fall into a permissible range.

The basic configuration of a sensor module will be described schematically with reference to FIG. 15. The module principally comprises two of a sensor probe component and a sensor control circuit unit. By separating the probe component and the control circuit unit from each other, heat-proof nature can be assured even in the case of measuring high-temperature fluid such as exhaust gas from the internal combustion engine. In case the temperature of target fluid is low, mergence of the two components into one component does not matter. The sensor device including the first and second heating resistors and the temperature measuring resistor for fluid temperature detection is connected to the control circuit unit. In the control circuit unit, an analog control circuit section including an analog control circuit for the first heating resistor and other analog control circuits for individual sensor elements are arranged and an output value from each of the analog control circuits is inputted to a digital section. In the digital section, the inputted analog signal is A/D converted, processed on the basis of various kinds of signals and then D/A converted to provide a signal which is delivered out of the sensor module. In the case of the $T_h$ type, correction needs to be made particularly on the basis of changes in temperature of fluid. Especially when taking the structure shown in FIG. 13, for instance, the fluid temperature dependent change is corrected in the digital signal processor on the basis of a signal from the fluid temperature detection circuit. This is the basic configuration of the control system.

Next, a concrete structure of the sensor device for realizing an embodiment of the invention will be described. The sensor device for flow rate detection is schematically structured as shown in FIGS. 16A and 16B. In the sensor device for flow rate detection, the support member has lead members (conductors) for supporting the individual resistors, with the lead members projecting from the second heating resistor so as to be arranged collectively in one direction. Namely, lead members supporting the first heating resistor pass through the interior or the peripheral surface of the temperature measuring resistor and the second heating resistor, terminating in connection to the console. By supporting the sensor device in a cantilever fashion in this manner, the temperature measuring resistor and the second heating resistor can be put together, thus promoting the productivity. FIG. 16A shows an example wherein first heating resistor 1 and temperature measuring resistor 9 are separated with a gap and connected with support member 4. FIG. 16B shows another example wherein first heating resistor 1 is adjoining temperature measuring resistor 9. The structure of the flow meter may be selected from these examples in consideration with productivity, required size of the sensor element.

Figure 17:
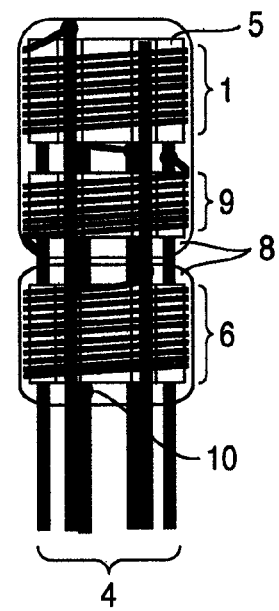
FIG. 17 is a diagram illustrating a concrete structure 1 of the sensor device for materializing the embodiments of the invention.
Figure 18:
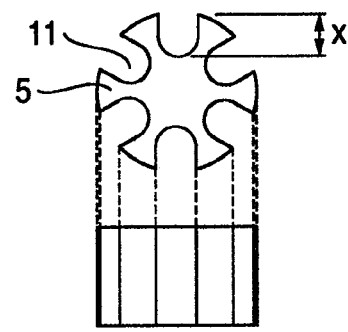
FIG. 18 is a diagram showing an example of external view of an alumina pipe used for formation of the FIG. 17 sensor device according to the invention.

Turning to FIG. 17, there is illustrated a cantilever structure type sensor device based on the winding type device used for intake air flow meter. Starting from the tip end of the device, a first heating resistor 1, a temperature measuring resistor 9 and a second heating resistor 6 are sequentially arranged in this order, a conductor is wound plural times on an alumina pipe 5 and glass 8 for insulating protection of the conductor is coated on the surface of the coiled conductor. An example of preferable shape of the alumina pipe 5 is shown in FIG. 18. In the outer periphery of the alumina pipe 5, a plurality of grooves 11 for receiving lead members of the support member 4 are formed. In FIG. 18, six grooves are exemplified to permit one resistor to utilize two grooves. The lead members of support member 4 are fitted in individual grooves from their circumferential sides and thereafter, a conductor forming each resistor is wound. Accordingly, the depth of the lead member fitting groove needs to be sufficiently larger than the contour form of the lead member. In FIG. 17, a black dot indicates a connection port 10 of each resistor to the lead member and the resistor is fixed to it by welding, for example. In arranging the temperature measuring resistor, close intimate disposition, which disposition is bracketed by glass 8, of the first heating resistor 1 and the temperature measuring resistor 9 is considered efficient by taking the productivity into account but they may be spaced apart from each other by a distance effective for prevention of the occurrence of contamination and each of them may be coated with glass.

Figure 19:
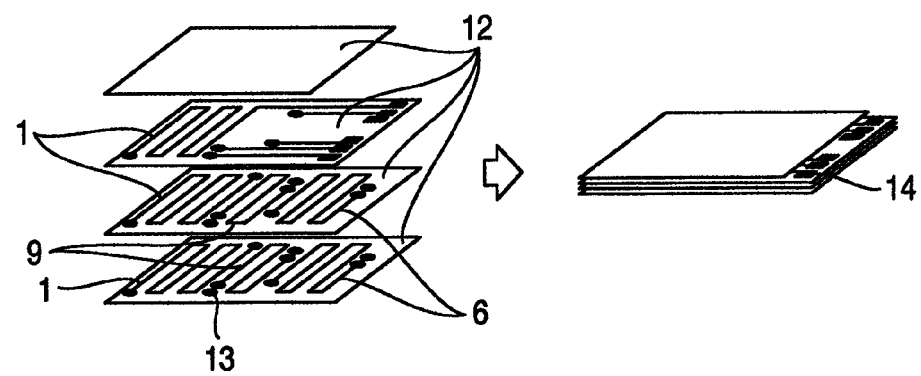
FIG. 19 is a diagram illustrating a concrete structure 2 of the sensor device for materializing the embodiments of the invention.

Another technique to which the laminated substrate technique is applied is conceivable. An example of structure of a laminated substrate type sensor device is illustrated in FIG. 19. A plurality of resistors (conductors) are intervened among individual laminations of insulating substrates 12. Four layers are exemplified in FIG. 19 but the number of laminated layers may be increased or decreased in accordance with resistance values the individual resistors need. If a resistor is laid to stride over adjacent laminations, electrical connection can be made by utilizing a veer hole 13. A special attention is to be made to the fact that a pad 14 representing a connection port to the console will possibly be deteriorated by heat transferred from the heating port (second heating resistor 6) heated to high temperatures. To cope with this problem, the distance between heating port 6 and pad port 14 needs to be managed to be sufficiently large.

When the above sensor module is used for measuring flow rates of exhaust gas of the internal combustion engine, the heating resistors 1 and 6 undergoing current conduction to be heated to high temperatures can be prevented from being deposited with contaminants. Further, the temperature measuring resistor interposed between the two heating resistors can receive heat from the heating resistors so as to be maintained at substantially the same temperature as those of the heating resistors and consequently, can be prevented from being deposited with contaminants. But the temperature measuring resistor (CW) dedicated to detect fluid temperatures is not heated by current conduction and besides it is spaced apart from the heating resistor to have a temperature substantially equal to that of the fluid, being liable to permit deposition of contaminants to proceed. With contaminants deposited on the surface of the CW, the difference between the CW temperature and the fluid temperature grows, resulting in the possibility that the flow rate detected by the sensor becomes extremely erroneous.

The disposition of both the CW and the heating resistor in the fluid gives rise to a problem that the installation space and the pressure loss increase.

To solve the above problem, detection of the fluid flow rate without resort to the CW is advantageous. A method for detection of the flow rate without using the CW will be described hereunder.

Figure 20:
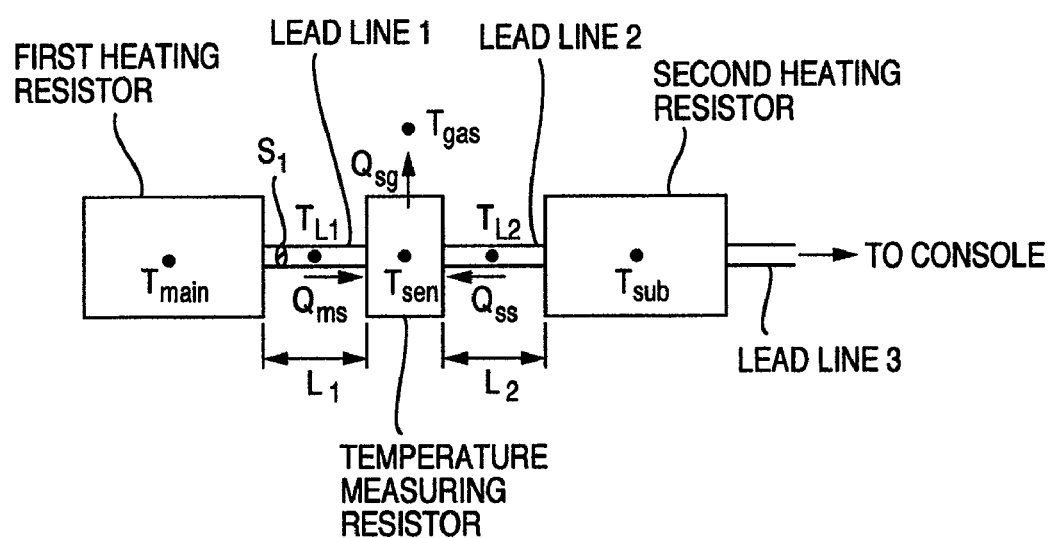
FIG. 20 is a diagram illustrating a thermal model of the sensor device of the present invention.

Turning to FIG. 20, there is illustrated a thermal calculation model of the sensor elements according to the present invention as shown in FIG. 16. From the left in the figure, the first heating resistor, temperature measuring resistor and second heating resistor are arranged in series and the first heating resistor is connected to the temperature measuring resistor by a lead line 1, with the temperature measuring resistor being connected to the second heating resistor by a lead line 2. The second heating resistor is connected to the console by a lead line 3.

A black dot in FIG. 20 indicates a temperature defining point in the thermal model, with $T_{main}$, $T_{sens}$, $T_{sub}$, $T_{L1}$, $T_{L2}$ and $T_{gas}$ indicating the first heating resistor temperature, the temperature measuring resistor temperature, the second heating resistor temperature, the temperature of lead line 1, the temperature of lead line 2 and the fluid temperature, respectively.

Where the quantity of heat coming from the lead line 1 to the temperature measuring resistor is $Q_{ms}$, the quantity of heat coming from the lead line 2 to the temperature measuring resistor is $Q_{ss}$ and the quantity of heat dissipated from the temperature measuring resistor to the fluid is $Q_{sg}$, equation (4) is held according to the heat quantity balance:

$$Q_{sg} = Q_{ms} + Q_{ss} \quad (4)$$

Where the thermal conductivity is $h_s$ and the surface area of temperature measuring resistor is $S_s$, the quantity of heat dissipation from the temperature measuring resistor to the fluid is expressed by equation (5):

$$Q_{sg} = S_s h_s (T_{sens} - T_{gas}) \quad (5)$$

Further, where the distance between the center of lead line 1 and the temperature measuring resistor is $L_1$, the thermal conductivity of lead line is $\lambda$ and the cross-sectional area of lead line 1 is $S_1$, the quantity of heat $Q_{ms}$ from lead line 1 to temperature measuring resistor is expressed by equation (6):

$$Q_{ms} = \frac{2\lambda S_1}{L_1}(T_{L1} - T_{sens}) \quad (6)$$

Similarly, the quantity of heat $Q_{ss}$ from lead line 2 to temperature measuring resistor is expressed by equation (7):

$$Q_{ss} = \frac{2\lambda S_1}{L_2}(T_{L2} - T_{sens}) \quad (7)$$

According to the thermal balance expression for the lead line, temperatures $T_{L1}$ and $T_{L2}$ of the lead lines can be expressed by equations (8) and (10), respectively:

$$T_{L1} = \frac{c_{1m}(T_{main} + T_{sens}) + c_{2m}T_g}{2c_{1m} + c_{2m}} \quad (8)$$

where $$c_{1m} = 2\lambda S_1/L1, \; c_{2m} = S_{L1}h_{L1} \quad (9)$$

$$T_{L2} = \frac{c_{1s}(T_{sub} + T_{sens}) + c_{2s}T_g}{2c_{1s} + c_{2s}} \quad (10)$$

where $$c_{1s} = 2\lambda S_1/L_2, \; c_{2s} = S_1 h_{L2} \quad (11)$$

In the above equations, $h_{L1}$ and $h_{L2}$ represent the thermal conductivities the surfaces of lead lines 1 and 2 have and $S_{L1}$ and $S_{L2}$ represent the surface areas of lead lines 1 and 2, respectively.

Mass flow rate $\rho U$ in the thermal type flow meter is expressed by equation (12):

$$\rho U = c \frac{I_{main}^4}{(T_{main} - T_g)^2} \quad (12)$$

where $\rho$ represents fluid density, U fluid speed, $I_{main}$ current supplied to the first heating resistor and c coefficient determined by the sensor size and physical property.

The thermal conductivities $h_s$, $h_{L1}$ and $h_{L2}$ in equations (5), (9) and (11) are expressed by a function of the fluid flow rate $\rho U$ and the fluid temperature $T_g$ as follows:

$$h = \text{func}(\rho U, T_g) \quad (13)$$

Generally, the resistance value the resistor has is related to the temperature by equation (14):

$$R = R_0\{1 + TCR \cdot (T - T_0)\} \quad (14)$$

where $R_0$ is a resistance value at a reference temperature $T_0$ and $T_{CR}$ is a resistance temperature coefficient. Accordingly, by using equation (14), the temperatures $T_{main}$, $T_{sub}$ and $T_{sens}$ the heating resistors and temperature measuring resistor exhibit, respectively, can be determined from the resistance values of the heating resistor and temperature measuring resistor.

By solving a simultaneous equation of equations (4) to (13), the fluid temperature $T_g$ and fluid flow rate $\rho U$ can be determined. The simultaneous equation of equations (4) to (13) is a nonlinear one but it can be solved by using various known reiterative calculation methods such as for example Newton-Raphson method.

Figure 21:
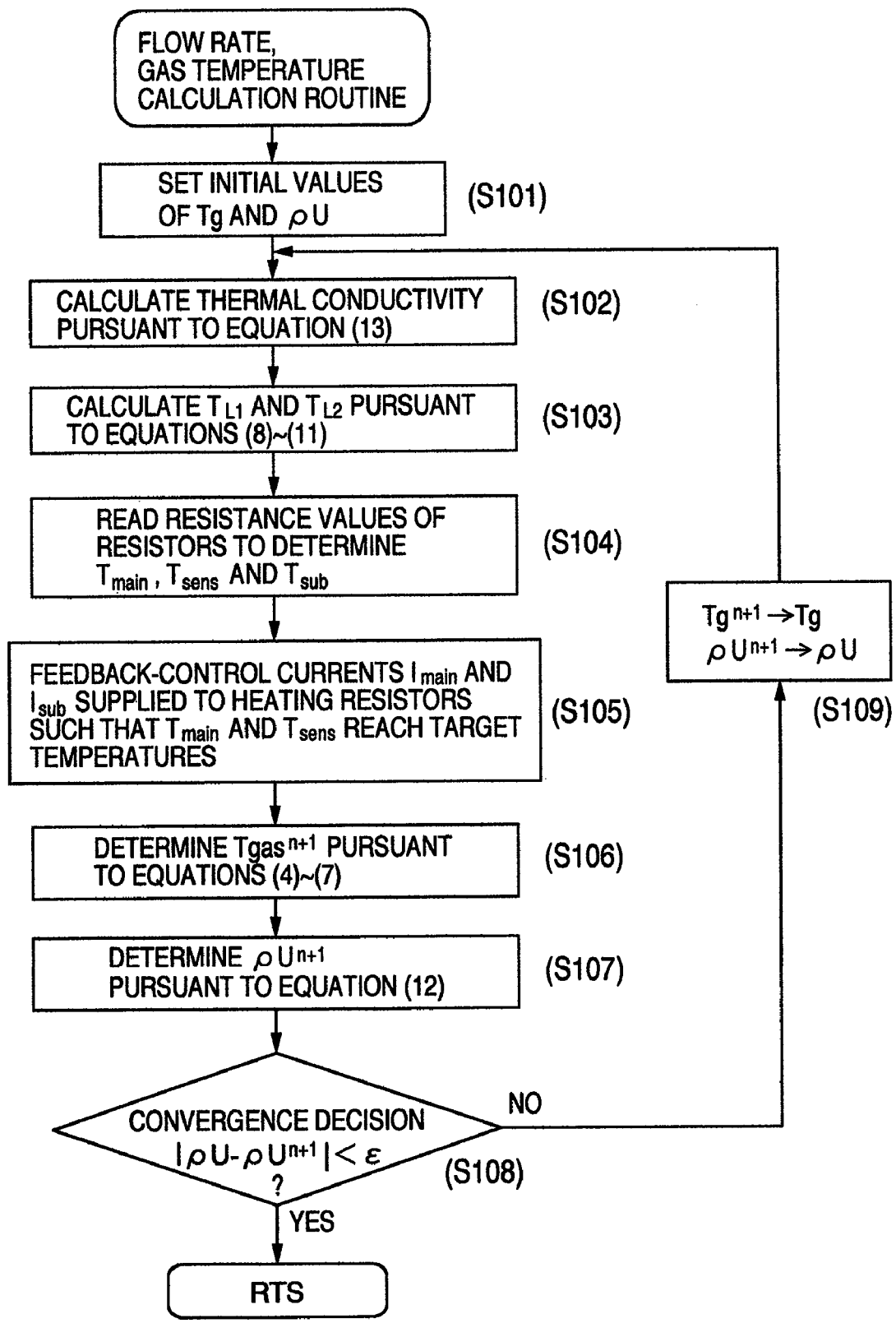
FIG. 21 is a flowchart of calculation of fluid flow rate in the invention.

The aforementioned procedures will be explained with reference to a flow chart shown in FIG. 21. FIG. 21 shows a control flow chart for controlling the sensor element shown in FIGS. 16A and 16B. Firstly, initial values of fluid temperature $T_g$ and fluid flow rate $\rho U$ are set (S101). As the initial values, room temperature 20° C., for example, is set to the fluid temperature $T_g$ and 0, for example, is set to the fluid flow rate $\rho U$. Next, by using equation (3), thermal conductivity $h_s$ at the surface of temperature measuring resistor, thermal conductivity $h_{L1}$ at the surface of lead line 1 and thermal conductivity $h_{L2}$ at the surface of lead line 2 are calculated (S102). Subsequently, by using equations (8) to (11), temperature $T_{L1}$ and temperature $T_{L2}$ of the lead lines 1 and 2 are calculated (S103). Then, resistance $R_{main}$ of the first heating resistor, resistance $R_{sub}$ of the second heating resistor and resistance $R_{sen}$ of the temperature measuring resistor are read and by using equation (14), temperature $T_{main}$ of the first heating resistor, temperature $T_{sub}$ of the second heating resistor and temperature $T_{sen}$ of the temperature measuring resistor are determined from the individual resistance values, respectively (S104). Thereafter, supply current $I_{main}$ to the first heating resistor is controlled through feedback control such that the temperature $T_{main}$ of first heating resistor becomes a preset, predetermined temperature (S105). Since the heating resistor is heated by Joule heat generation, the temperature of heating resistor rises as the current supplied to the heating resistor increases but it falls as the current supplied to the heating resistor decreases. By controlling the current supplied to the heating resistor through feedback control in accordance with a difference between a target temperature and a temperature at present, the temperature of the heating resistor can be set to the target temperature. The target temperature of first heating resistor is set to a temperature which is higher by a constant temperature difference $\Delta T_h$ than the fluid temperature $T_g$. In measuring intake gas and exhaust gas of the internal combustion engine, $\Delta T_h$ is 200° C., for example. The second heating resistor is set through procedures shown in the flowchart of FIG. 12 or 14. Next, by using equations (4) to (7), an update value $Tg^{n+1}$ of fluid temperature is determined (S106). By substituting $Tg^{n+1}$ for equation (13), an update value $\rho U^{n+1}$ of fluid flow rate is determined (S107). In step S108, the fluid flow rate $\rho U$ is decided as to whether to be convergent. If the change width of $\rho U$ is larger than a predetermined small value $\xi$, the update value $Tg^{n+1}$ of fluid temperature is changed to its initial value $T_g$ and the update value $\rho U^{n+1}$ of fluid flow rate is changed to its initial value $\rho U$ (S109) and the program returns to the step S102. The above steps are repeated until the change width of $\rho U$ becomes less than the predetermined small value $\xi$ (becomes convergent) to determine a fluid flow rate $\rho U$. In the present embodiment, for determination of the fluid flow rate $\rho U$, the simple reiterative calculation is carried out but by using another reiterative calculation method such as the Newton/Raphson method, the number of reiterative calculations can be reduced to reduce the calculation time for determination of the fluid flow rate $\rho U$.

Figure 27:
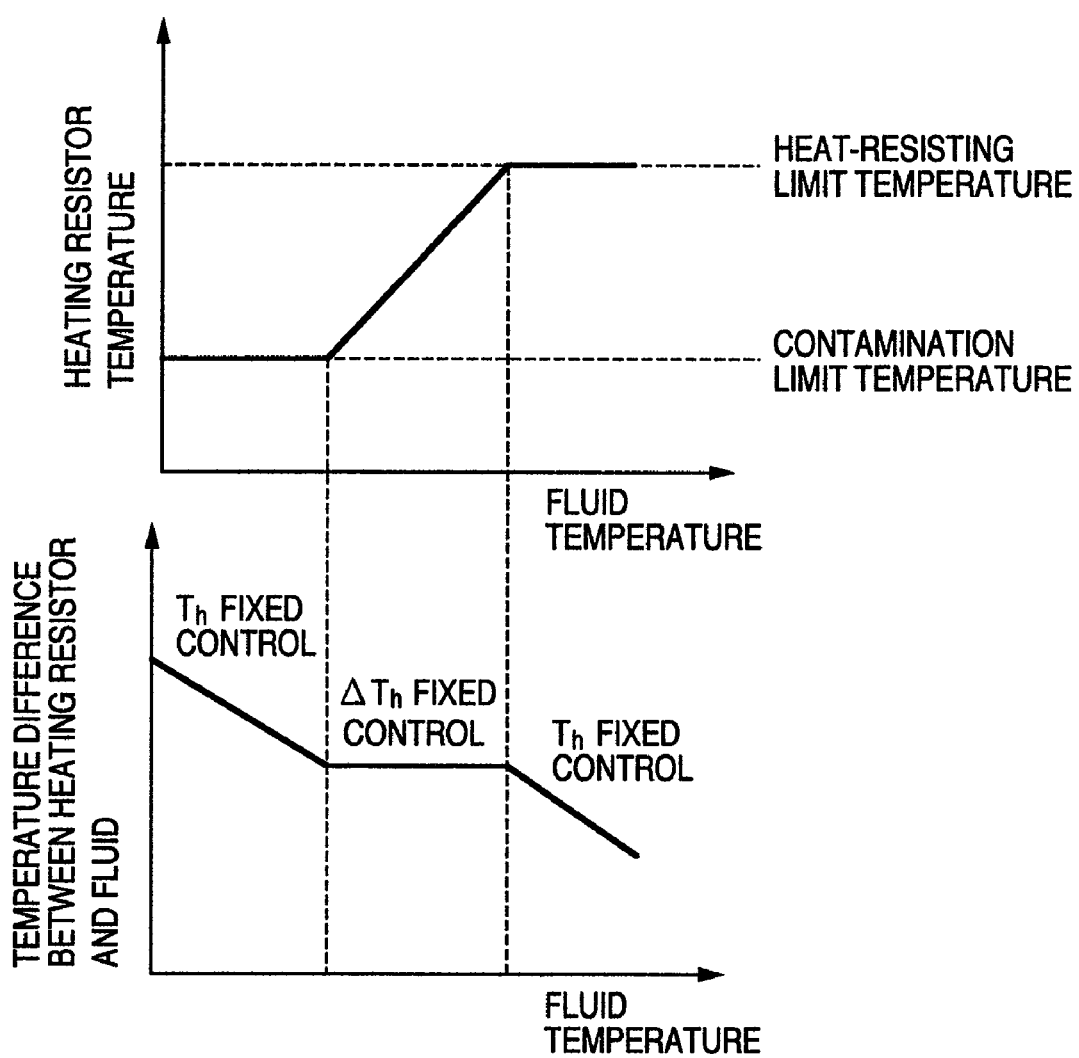
FIG. 27 is a graphical representation showing an example of a method for controlling the temperature of the heating resistor in the invention.

In the foregoing, an example is described in which the temperature $T_{main}$ of the first heating resistor becomes higher by the constant temperature difference $\Delta T_h$ than the fluid temperature $T_g$ through feedback control. In a stream field where the fluid temperature $T_g$ changes greatly, there is the possibility that as the fluid temperature rises, the setting temperature of the first heating resistor will exceed a heat-proof limit and the heating resistor will be broken. Contrarily, if the fluid temperature falls, the temperature of the first heating resistor will decrease excessively and the heating resistor will be contaminated. Then, a method is conceivable in which temperature control for the heating resistor is changed in accordance with the fluid temperature. When, as shown in FIG. 27, the temperature of the heating resistor is lower than the contamination limit temperature or the fluid temperature is higher than the heat-proof limit temperature, control is carried out such that the temperature of the heating resistor is kept to be constant and in other cases, the temperature of the heating resistor is so controlled as to make $\Delta T_h$ constant. By changing the setting temperature of the heating resistor in accordance with the fluid temperature, a flow meter having high reliability in handling the contamination and heat can be realized.

Another method of determining the flow rate irrespective of the fluid temperature will be described. When determining the relation between flow rate $\rho U$ and current value I of the heating resistor from equation (12) in respect of each of the second heating resistor and first heating resistor, there result equations (15) and (16):

$$C_s I_{sub}^2 = \sqrt{\rho U}(T_{Sub} - T_g) \tag{15}$$

$$C_m I_{main}^2 = \sqrt{\rho U}(T_{main} - T_g) \tag{16}$$

By subtracting equation (16) from equation (15) and arranging the subtraction difference for the flow rate $\rho U$, equation (17) can be obtained:

$$\rho U = \frac{(C_s I_{sub}^2 - C_m I_{main}^2)^2}{(T_{sub} - T_{main})^2} \tag{17}$$

Figure 26:
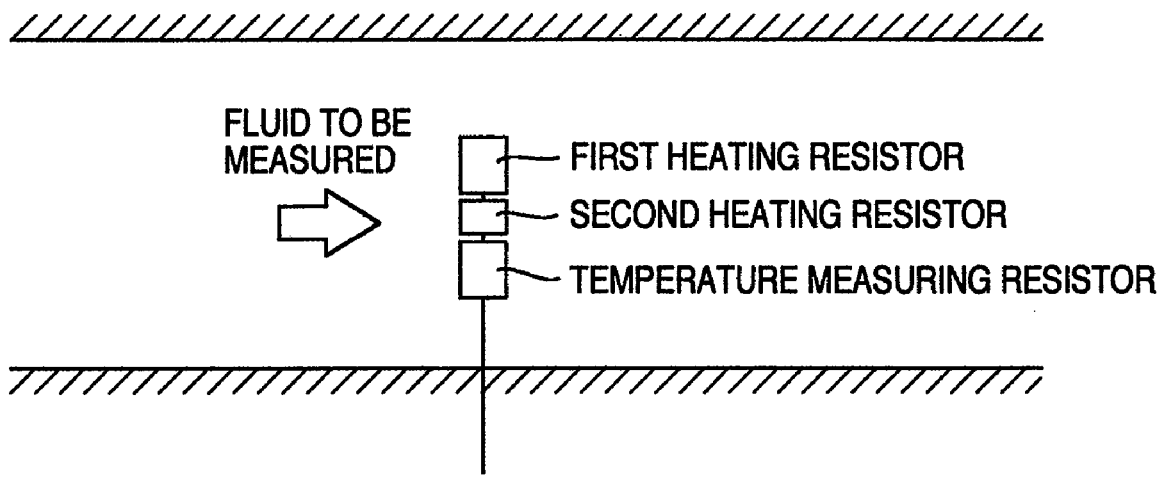
FIG. 26 is a schematic diagram showing direction of the disposition of the sensor device in relation to the fluid stream in the present invention.

By using equation (17), the fluid flow rate $\rho U$ unrelated to temperatures can be determined from the temperature $T_{main}$ and current $I_{main}$ of the first heating resistor and the temperature $T_{sub}$ and current $I_{sub}$ of the second heating resistor. Since the speed distribution of fluid is non-uniform in general, it is preferable that the first and second heating resistors be arranged closely to each other to enable them to measure fluid at the same speed. By using a sensor probe in which the first and second heating resistors are arranged integrally as shown in FIG. 17 or 19, the difference in fluid speed can be small between the first and second heating resistors and errors in flow rate detection attributable to the speed distribution can be reduced. Further, for example, when fluid heated by the first heating resistor streams on the surface of the second heating resistor, an error in flow rate detection takes place because of a change in temperature of the fluid. Then, as shown in FIG. 26, it is preferable that the first and second heating resistors may preferably be arranged vertically to the flow direction of fluid.

Incidentally, in equation (17), its denominator is the difference between the temperature $T_{sub}$ of second heating resistor and the temperature $T_{main}$ of first heating resistor and therefore, when the temperature difference between $T_{sub}$ and $T_{main}$ is small, a slight temperature detection error causes a large flow rate detection error to take place. To prevent this inconvenience, the flow rate detection method (method 1) based on the aforementioned procedures shown in FIG. 21 is preferably exchanged with that (method 2) using equation (18) in accordance with the temperature difference between $T_{sub}$ and $T_{main}$. More particularly, when $T_{sub}-T_{main}$ is larger than a preset threshold value, the flow rate is determined pursuant to method 2 and for $T_{sus}-T_{main}$ being smaller than the preset threshold value, the flow rate is determined pursuant to method 1. Since the operation amount in the flow rate detection based on method 2 is less than that based on method 1, the exchange between the methods 1 and 2 according to the temperature difference between $T_{sus}$ and $T_{main}$ is advantageous in that operation load imposed on the flow rate detection can be reduced as compared to the case of using only the method 1.

Figure 22:
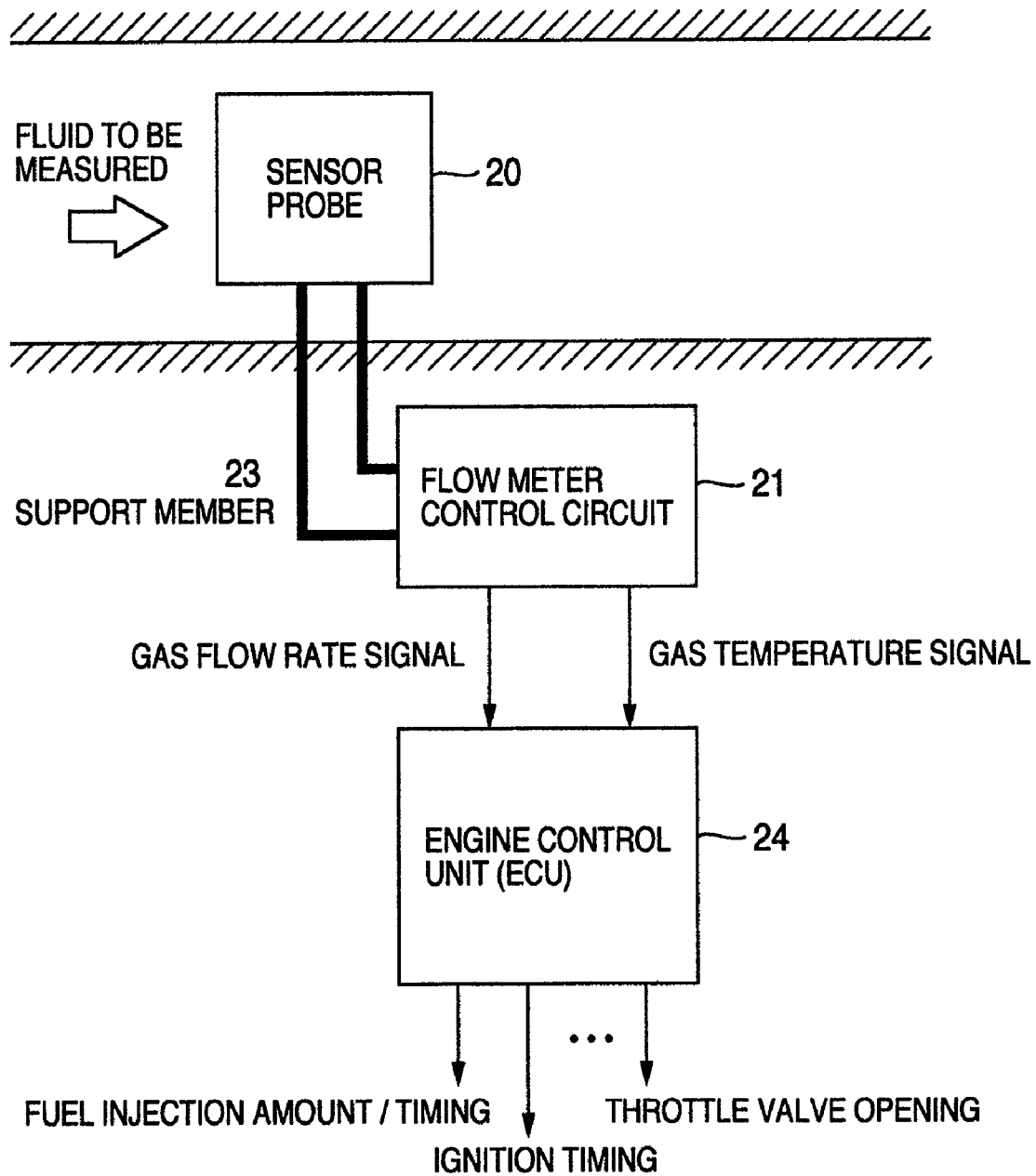
FIG. 22 is a diagram schematically illustrating an example 1 of construction of the flow meter according to the invention.

In the foregoing embodiments, the fluid temperature can be calculated from temperatures of the two heating resistors and that of the single temperature measuring resistor interposed therebetween and hence a temperature measuring resistor dedicated to detection of the fluid temperature (cold wire) need not be disposed outside the heating resistor. For this reason, the thermal type flow meter according to the present embodiment can be constructed, as shown in FIG. 22, of a sensor probe 20 integrally having two heating resistors and one temperature measuring resistor, a flow rate control circuit 21 adapted to control the sensor probe 20 and to determine a fluid flow rate from a detection value of the sensor probe, and a support member 22 for connecting the sensor probe 20 and the control circuit 21. Further, when the present flow meter is used as a flow meter for intake gas, exhaust gas or exhaust gas re-circulation (EGR) in the engine, a signal having the relation to the detected fluid flow rate value is delivered out of the flow rate control circuit to an engine control circuit (ECU) 24. On the basis of the flow rate value detected by the flow meter, the engine control circuit controls, for example, fuel amount supplied to the engine, injection timing, throttle opening for controlling intake air flow, throttle opening for controlling EGR gas flow rate, and ignition timing.

Figure 29:
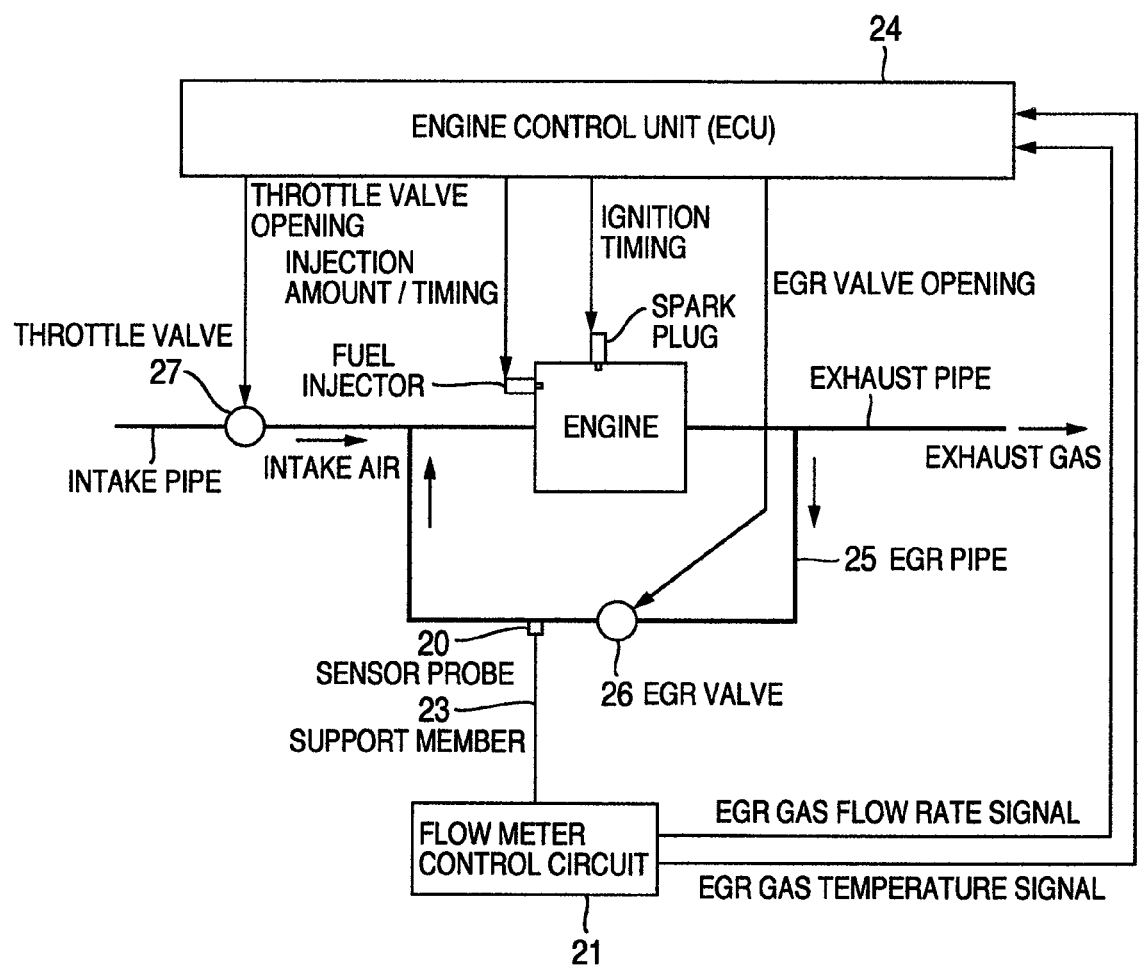
FIG. 29 is a block diagram showing an embodiment of engine control system using the flow meter according to the present invention.

FIG. 29 shows an embodiment of the engine control system wherein the EGR gas flow rate is detected by the flow meter and the detected gas flow rate is used for the engine control. EGR valve 26 is disposed in the EGR pipe 25. The gas flow meter 20 (sensor probe) of the present invention is disposed downstream of the EGR valve 26. Flow meter control circuit 21 transmits EGR gas flow rate signal and EGR gas temperature signal to engine control unit (ECU) 24. The ECU 24 controls the EGR valve 26, throttle valve opening, injection fuel amount, injection timing, and ignition timing so as to optimize the combustion state of the engine. By using the gas flow rate accurately measured by the gas flow meter and the temperature information for the engine control, more amount of EGR gas can be re-circulated into the engine without increasing engine torque variation so as to improve the combustion efficiency of the engine by reducing throttle loss of the engine. Further, by using the gas flow rate accurately measured by the gas flow meter, good fuel economy and good emission control can be realized for engine operation in homogeneous charge compression ignition (HCCI) and pre-mixed charge compression ignition (PCCI) in wider range of engine speed and engine torque. In some applications, information about the fluid temperature is needed to determine the above control values. For example, during start of the engine, easiness of engine start changes depending on the intake gas temperature and hence changing the ignition timing according to the intake gas temperature has been practiced widely. Further, since feasibleness of occurrence of knocking changes with the intake gas temperature during high load running, changing the ignition timing according to the intake gas temperature has also been practiced widely. With this point in mind, the signal obtained inside the flow rate control circuit and having the relation to the fluid temperature may be outputted to the ECU. This can eliminate the necessity of separate provision of a temperature sensor for detection of the fluid temperature, ensuring that the pressure loss can be reduced, a degradation in reliability due to sensor contamination can be avoided and the cost can be reduced.

For suppressing operation load imposed on the engine control circuit, separate arrangement of the flow meter control circuit and engine control circuit is preferable but the function of the flow meter control circuit may be incorporated in the engine control circuit.

In a thermal type flow meter constructed having the temperature measuring resistor (cold wire) outside the heating resistor according to teachings of the present invention, correction of changes in characteristics of the cold wire can be conceivable.

Figure 23:
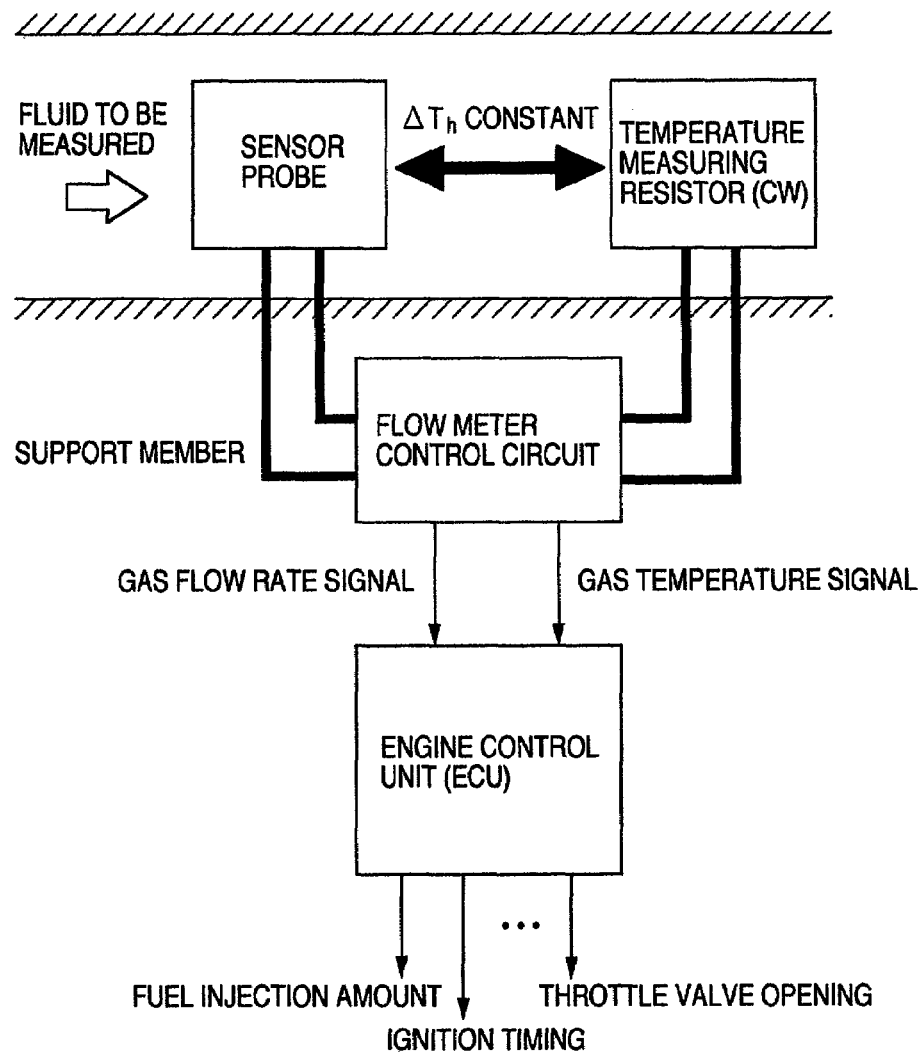
FIG. 23 is a diagram schematically illustrating an example 2 of construction of the flow meter according to the invention.

In FIG. 23, the sensor probe has the structure of the two heating resistors and one temperature measuring resistor interposed therebetween as described previous in connection with FIG. 17 or 19. Further, another type of temperature measuring resistor (cold wire) is arranged independently of the sensor probe in fluid to be measured. Each of the sensor probe and the cold wire is connected to the flow meter control circuit. The flow meter control circuit controls the heating resistors inside the sensor probe such that the temperature difference $\Delta T_h$ between the temperature of the first heating resistor inside sensor probe and the fluid temperature detected by the cold wire can be constant.

Figure 24:
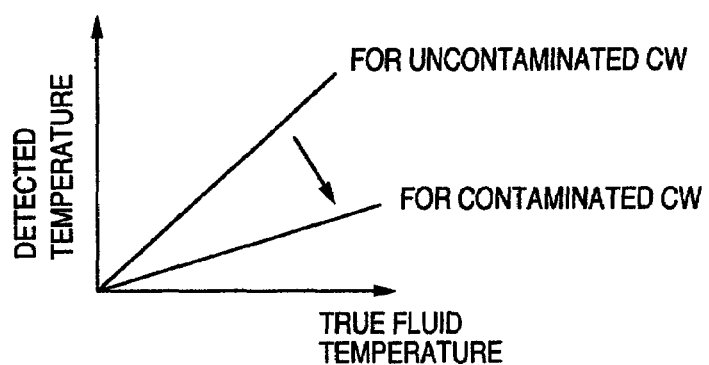
FIG. 24 is a graph showing an example of changes in detection temperature as the cold wire becomes contaminated.

Referring to FIG. 24, the relation between a true fluid temperature and a temperature detected with the cold wire (CW) in the thermal type flow meter shown in FIG. 23 is illustrated. When the cold wire (CW) is not contaminated, the temperature detected by the cold wire substantially equals the true fluid temperature and therefore, the inclination in a graph of FIG. 24 is 45°. In contrast, with the cold wire contaminated, a contaminant deposited on the surface of the cold wire exhibits a thermal resistance to make heat from the fluid difficult to transfer to the cold wire, with the result that the temperature detected with the cold wire is lower than the true fluid temperature. As the difference between the detection temperature by the cold wire and the true fluid temperature increases, errors in fluid flow rate detected by the heating resistor increase.

Figure 25:
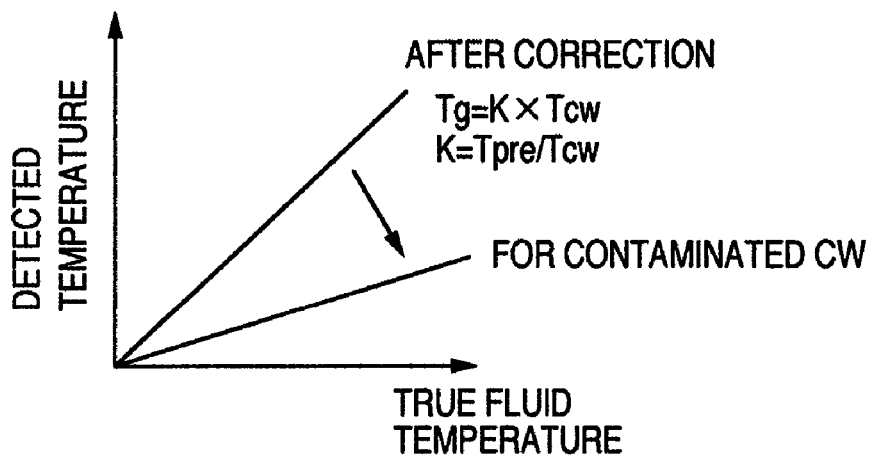
FIG. 25 is a conceptual diagram for explaining fluid temperature correction in the present invention.

Then, in accordance with the procedures shown in FIG. 21 previously, a predictive fluid temperature $T_{pre}$ is calculated from temperatures of the first heating resistor, second heating resistor and temperature measuring resistor inside the sensor probe and a correction coefficient K for fluid temperature is determined by $K=T_{pre}/T_{cw}$, where $T_{cw}$ is fluid temperature detected with the cold wire. By using the correction coefficient K, a fluid temperature $T_g$ after correction is determined by $T_g=K \times T_{cw}$ so that by using the corrected temperature, a fluid flow rate may be determined which contributes to preventing the flow rate detection error due to changes in characteristics of the cold wire from being increased (FIG. 25). Generally, the change in characteristics due to contamination, for example, on the cold wire seems to develop explicitly by consuming a relatively long time period and therefore, calculation of the correction coefficient K need not be performed constantly but can be done at intervals of relatively long time (for example, in the flow rate detection in the engine, every several hours). In this manner, the detection temperature of the cold wire can be used as it is in the normal flow rate measurement and in comparison with the case where the fluid temperature is calculated from temperatures of the first heating resistor, second heating resistor and temperature measuring resistor inside the sensor probe, operation load inside the flow meter control circuit can be reduced. This makes it possible to achieve fluid measurement of high response capability while avoiding the flow rate detection error from increasing owing to changes in characteristics of the cold wire.

Figure 28:
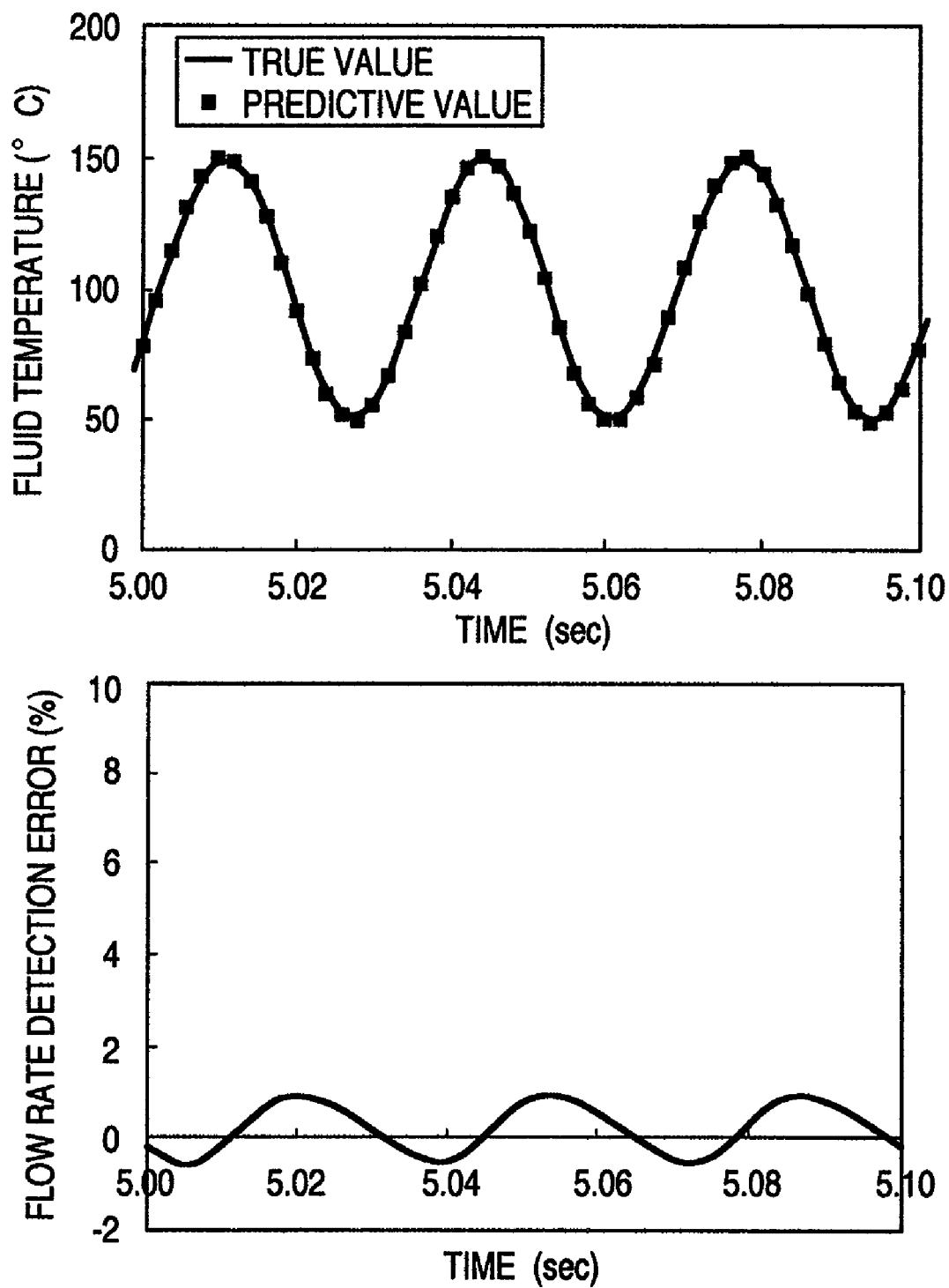
FIG. 28 is a graphical representation showing an example of results of simulation for verifying beneficial effects of the present invention.

Results of verification of the flow rate detection accuracy according to the invention are illustrated in FIG. 28. In particular, illustrated in FIG. 28 are results of simulation of numerical values of fluid temperature and fluid flow rate obtained in accordance with the procedures according to the invention previously described in connection with FIG. 21. In the present simulation, on the assumption that the speed of air is fixed to 50 m/s, the gas temperature is changed within a width of from 50° C. to 150° C. at a period of 33 ms (at a frequency of 30 Hz), thus providing the results as shown in FIG. 21. This demonstrates that according to the present invention, even when the fluid temperature changes at a short period, the fluid temperature and fluid flow rate can be detected with high accuracies.

According to the present invention, because the disposition of the temperature measuring resistor for detection of fluid temperature can be dispensed with, an increase in flow rate detection error attributable to contamination deposited on the temperature measuring resistor can be prevented in the fluid flow meter used in an exhaust gas environment subject to stringent contamination-proof and heat-proof requirements. Further, in the embodiments of the invention, the second heating resistor (sub-heater) for preventing the sensor characteristics from being changed by contamination on the lead line can be diverted to the temperature measuring resistor for detecting the lead line temperature and consequently, heating resistor and temperature measuring resistor need not be provided newly additionally for the purpose of practicing the present invention.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A heating resistor type flow rate measuring apparatus comprising:
   a first heating resistor arranged in a passage;
   a support member projecting from a console for supporting said first heating resistor and said support member includes a plurality of lead line members;
   a second heating resistor connected to said support member;
   temperature detection means including a temperature measuring resistor connected to said plurality of lead line members and interposed between said first heating resistor and said second heating resistor; and
   control means for controlling heat generation by said second heating resistor such that temperatures detected by said temperature detection means fall into a predetermined temperature range inclusive of temperatures of said first heating resistor,
   wherein each of said first heating resistor, said second heating resistor, and said temperature measuring resistor is electrically connected to said plurality of lead line members, and
   wherein the temperature measuring resistor is arranged between the first heating resistor and the second heating resistor, with the first heating resistor mounted adjacent a top of said support member and said second heating resistor is disposed adjacent said console.

2. A heating resistor type flow rate measuring apparatus according to claim 1 further comprising:
   a temperature sensitive resistor for detecting ambient temperatures; and
   second control means for controlling heat generation by said first heating resistor such that the temperatures of heat generated by said first heating resistor differs by a predetermined temperature difference from the ambient temperature detected by said temperature sensitive resistor.

3. A heating resistor type flow rate measuring apparatus according to claim 2, wherein said first heating resistor is supported by means of said support member in a cantilever fashion.

4. A heating resistor type flow rate measuring apparatus according to claim 3, wherein the predetermined temperature difference is 350° C. or more and said first heating resistor, said second heating resistor and said temperature detection means are arranged in an exhaust pipe of an engine.

5. A heating resistor type flow rate measuring apparatus according to claim 1, wherein said temperature detection means is a temperature measuring resistor, said first heating resistor is supported by means of said support member through the medium of a plurality of lead line members in a cantilever fashion, and said second heating resistor and said temperature measuring resistor are supported on said lead members.

6. A heating resistor type flow rate measuring apparatus according to claim 1, wherein said temperature detection means is a temperature measuring resistor, said first heating resistor, said second heating resistor and said temperature measuring resistor are stacked among laminated substrates, and one end of said laminated substrates is supported on said support member in a cantilever fashion.

7. A heating resistor type flow rate measuring apparatus according to claim 1, wherein said temperature detection means is a temperature measuring resistor, said first heating resistor is supported by said temperature measuring resistor through a first lead line member in a cantilever fashion and said temperature measuring resistor is supported by said second heating resistor through a second lead member in a cantilever fashion, and wherein said apparatus further comprises first calculation means for predicting a flow rate through operation based on stored initial values, a resistance value of said first heating resistor, a resistance value of said second heating resistor and a resistance value of said temperature measuring resistor.

8. A heating resistor type flow rate measuring apparatus according to claim 7 further comprising:
   second operation means for predicting a flow rate through operation on the basis of temperature and current of said first heating resistor and temperature and current of said second heating resistor.

9. An engine control system which comprises:
   a heating resistor type flow rate measuring apparatus including:
   a first heating resistor arranged in a passage;
   a support member projecting from a console for supporting said first heating resistor and said support member includes a plurality of lead line members;
   a second heating resistor connected to said support member;
   temperature detection means including a temperature measuring resistor connected to said plurality of lead line members and interposed between said first heating resistor and said second heating resistor; and control means for controlling heat generation by said second heating resistor such that temperatures detected by said temperature detection means fall into a predetermined temperature range inclusive of temperatures of said first heating resistor, wherein each of said first heating resistor, said second heating resistor, and said temperature measuring resistor is electrically connected to said plurality of lead line members, wherein the temperature measuring resistor is arranged between the first heating resistor and the second heating resistor, with the first heating resistor mounted adjacent a top of said support member and said second heating resistor is disposed adjacent said console, and wherein said engine control system further comprises:

combustion control means for controlling a combustion state of an engine; and means for controlling said combustion control means based on an EGR gas flow rate signal and an EGR gas temperature signal.

* * * * *